United States Patent
Tokudome (10) Patent No.: US 6,901,460 B2
(45) Date of Patent: May 31, 2005

(54) COMPETITIVE MANAGEMENT SYSTEM AND METHOD FOR EXTERNAL INPUT/OUTPUT DEVICES AND RECORDING MEDIUM RECORDING PROGRAM

(75) Inventor: Hirofumi Tokudome, Tokyo (JP)

(73) Assignee: NEC Corporation, Tokyo (JP)

(*) Notice: Subject to any disclaimer, the term of this patent is extended or adjusted under 35 U.S.C. 154(b) by 6 days.

(21) Appl. No.: 10/425,748

(22) Filed: Apr. 30, 2003

(65) Prior Publication Data

US 2003/0212885 A1 Nov. 13, 2003

(30) Foreign Application Priority Data

May 8, 2002 (JP) ........................................ 2002-132198

(51) Int. Cl.⁷ ................................................ G06F 3/00
(52) U.S. Cl. ............................................ 710/15; 710/18
(58) Field of Search ................................ 710/8, 17, 15, 710/18, 19, 62, 63, 72, 200

(56) References Cited

U.S. PATENT DOCUMENTS

| | | | |
|---|---|---|---|
| 3,680,054 A | | 7/1972 | Bunker et al. |
| 5,237,661 A | * | 8/1993 | Kawamura et al. ............ 710/52 |
| 5,345,308 A | * | 9/1994 | Bushman ..................... 356/364 |
| 5,916,311 A | * | 6/1999 | Kakiage ...................... 710/107 |
| 5,930,338 A | * | 7/1999 | McKendry et al. ....... 379/88.25 |
| 5,991,546 A | * | 11/1999 | Chan et al. .................... 710/62 |
| 6,078,942 A | | 6/2000 | Eisler et al. |
| 6,195,363 B1 | * | 2/2001 | Nakatsugawa ............... 370/455 |
| 6,453,325 B1 | * | 9/2002 | Cabrera et al. .............. 707/204 |
| 6,563,837 B2 | * | 5/2003 | Krishna et al. .............. 370/413 |

FOREIGN PATENT DOCUMENTS

| | | |
|---|---|---|
| EP | 0 049 521 A2 | 4/1982 |
| EP | 1 058 188 A2 | 12/2000 |

* cited by examiner

*Primary Examiner*—Jeffrey Gaffin
*Assistant Examiner*—Harold Kim
(74) *Attorney, Agent, or Firm*—Sughrue Mion, PLLC

(57) ABSTRACT

The present invention provides a competitive management system for external input/output devices in which there is no need for each service to make the competitive management for external input/output devices.

The competitive management system for external input/output devices comprises a transmission line management module for making the competitive management for external input/output devices with each service. The transmission line management module has a table indicating the support correspondence between external input/output device and service, and makes the competitive management by referring to this table. Accordingly, there is no need for each service to make the competitive management for external input/output devices.

15 Claims, 7 Drawing Sheets

|  | OBEX | DIAL-UP | EXTERNAL KEYBOARD | HANDS-FREE |
|---|---|---|---|---|
| USB | ○ | ○ | — | — |
| UART | — | — | ○ | ○ |
| IrDA | ○ | — | — | — |
| Bluetooth | ○ | ○ | — | ○ |

○ : SERVICE SUPPORT     — : SERVICE UNSUPPORT

FIG. 3

| SERVICE | SERVICE STATE | EXTERNAL INPUT / OUTPUT DEVICE |
|---|---|---|
| OBEX | IDLE → RESERVATION → DURING USE | — → IrDA |
| DIAL-UP | IDLE | — |
| EXTERNAL KEYBOARD | IDLE | — |
| HANDS-FREE | IDLE | — |

FIG. 4

| SERVICE | OBEX / DIAL-UP / EXTERNAL KEYBOARD / HANDS-FREE |
|---|---|
| SERVICE STATE | IDLE / RESERVATION / DURING USE |
| EXTERNAL INPUT / OUTPUT DEVICE | USB / UART / IrDA / Bluetooth OR THE LIKE |

| SERVICE | SERVICE STATE | EXTERNAL INPUT / OUTPUT DEVICE |
|---|---|---|
| OBEX | IDLE → RESERVATION → DURING USE | — → USB |
| DIAL - UP | IDLE | — |
| EXTERNAL KEYBOARD | IDLE | — |
| HANDS - FREE | IDLE | — |

COMPETITIVE MANAGEMENT SYSTEM AND METHOD FOR EXTERNAL INPUT/OUTPUT DEVICES AND RECORDING MEDIUM RECORDING PROGRAM

BACKGROUND OF THE INVENTION

1. Field of the Invention

The present invention relates to a competitive management system and method for external input/output devices and a recording medium recording program, and more particularly to a competitive management system and method for external input/output devices that is used in a portable terminal and a recording medium recording the program.

2. Description of the Prior Art

Most portable terminals including a portable telephone have typically a small amount of mounted memory, and a small-sized display screen, whereby the services available for the portable terminal are limited. For example, in an OBEX (Object Exchange) or a dial-up service (service for connecting to a certain communication network, only when needed, employing the telephone circuit or digital communication network), plural connecting parties are not permitted in most cases to utilize the same service at the same time.

However, some portable terminals have appeared having a plurality of different external device interfaces such as USB (Universal Serial Bus) and IrDA (Infrared Data Association) to enable various peripheral devices to be connected.

Most of the portable terminals are limited in the services that can be used for each external device interface. However, if the services are supported through a plurality of different external device interfaces, it is required to make a competitive management for external input/output devices not to use the same service at the same time.

If this competitive management is performed for each service, the same logic for competitive management is needed for each service. Also, when the service is appropriated for another portable terminal, or the number of external input/output devices mounted on the portable terminal is increased or decreased, it is required to modify the logic for each service, resulting in a lower development efficiency.

Thus, it is an object of the invention to provide a competitive management system and method for external input/output devices and a recording medium recording a program in which the above-mentioned problems are solved.

SUMMARY OF THE INVENTION

The present invention provides a competitive management system for external input/output devices in a portable terminal comprising a plurality of external input/output devices and one or more services usable with the external input/output devices, the system comprising transmission line managing means for managing the plurality of external input/output devices not to use the same service at the same time.

Also, this invention provides a competitive management method for external input/output devices in a portable terminal comprising a plurality of external input/output devices and one or more services usable with the external input/output devices, the method comprising a transmission line managing step of managing the plurality of external input/output devices not to use the same service at the same time.

Also, this invention provides a recording medium recording a program that enables a computer to perform a competitive management method for external input/output devices in a portable terminal comprising a plurality of external input/output devices and one or more services usable with the external input/output devices, the method comprising a transmission line managing step of managing the plurality of external input/output devices not to use the same service at the same time.

That is, according this invention, since the transmission line managing means makes the competitive management for services that are used in the plurality of different external input/output devices, it is unnecessary for each service to make the competitive management for external input/output devices.

Figure 1:
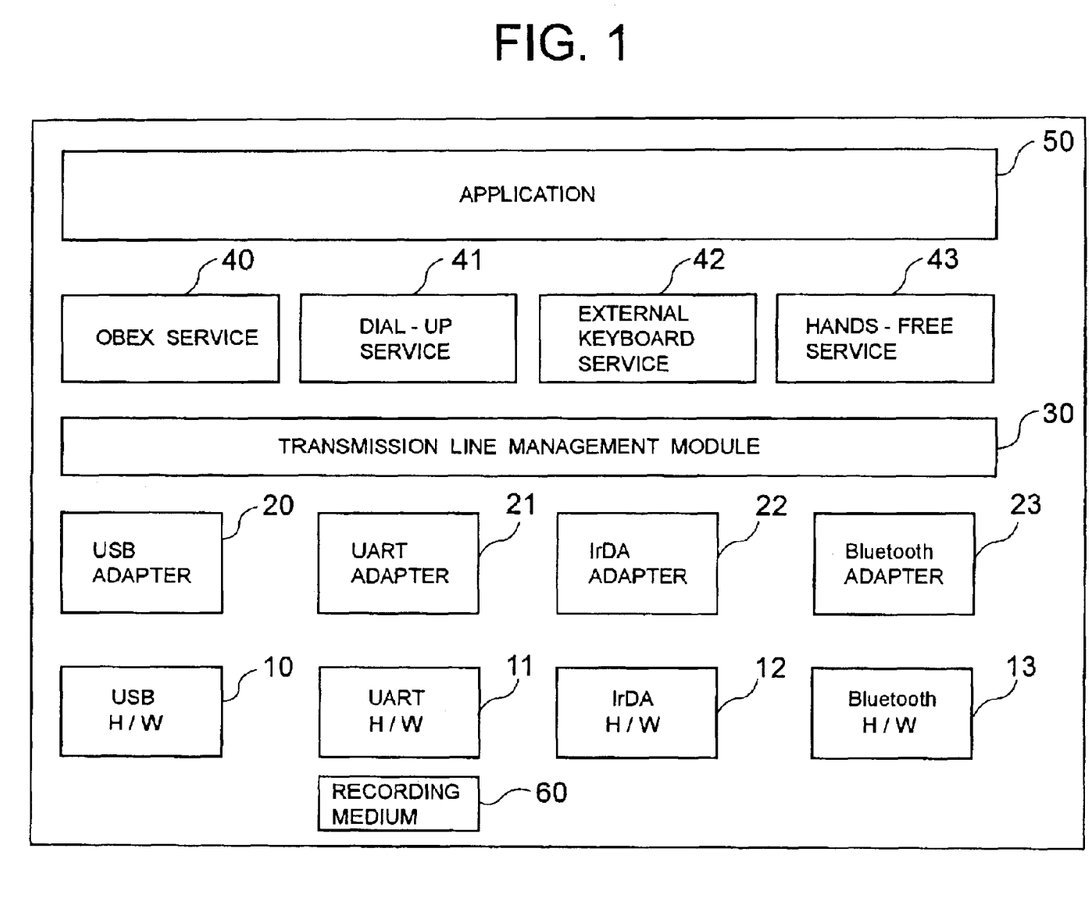
FIG. 1 is a block diagram showing a configuration of a competitive management system for external input/output devices according to an embodiment of this invention.

The invention provides a configuration for the portable terminal to make the competitive management for services that are usable in the plurality of different external input/output devices. FIG. 1 is a block diagram showing an example of the portable terminal having OBEX, dial-up, external keyboard, and hands-free as the services, and USB, UART, IrDA, and Bluetooth (registered trademark) as the external input/output devices. A transmission line management module between service and external input/output device manages the use condition of service, whereby it is possible to make the competitive management for external input/output devices not to use the same service at the same time.

DETAILED DESCRIPTION OF THE PREFERRED EMBODIMENTS

The preferred embodiments of the present invention will be described below with reference to the accompanying drawings. FIG. 1 is a block diagram showing a configuration of a competitive management system for external input/output devices according to an embodiment of this invention. This block diagram illustrates, as one example, the competitive management system for external input/output devices for a portable terminal.

Referring to FIG. 1, the competitive management system for external input/output devices for the portable terminal of the invention comprises the controllers for the external input/output devices, including a USB hardware (hereinafter denoted as H/W) 10, a UART (Universal Asynchronous Receiver Transmitter) H/W 11, an IrDA H/W 12 and a Bluetooth (registered trademark) H/W 13, an upper level interface (hereinafter denoted as I/F) with a transmission line management module, various types of adapters (including a protocol stack and a device driver) having I/F with each external output H/W as a lower level I/F, including a USB adapter 20, a UART adapter 21, an IrDA adapter 22 and a Bluetooth (registered trademark) adapter 23, the transmission line management module 30 having a function of managing a use state of service between the service and the external input/output device, an OBEX service 40 that is used in the external input/output device, a dial-up service 41, an external keyboard service 42 and a hands-free service 43, an application 50 using these services, and a recording medium 60 recording a program for use in managing the transmission line management module 30.

Herein, USB is a kind of serial interface, and aims at integrating the interfaces provided for individual peripheral devices. UART converts parallel signals sent from the computer into serial signals, or inversely converts serial signals sent from the serial device into parallel signals. Practically, the UART is supplied as a single LSI (Large Scale Integration) chip and packaged on an extension card (serial card) or mother board. IrDA is a kind of infrared data communication standard. Bluetooth (registered trademark) is an interface specification for a kind of short distance radio communication.

Figure 2:
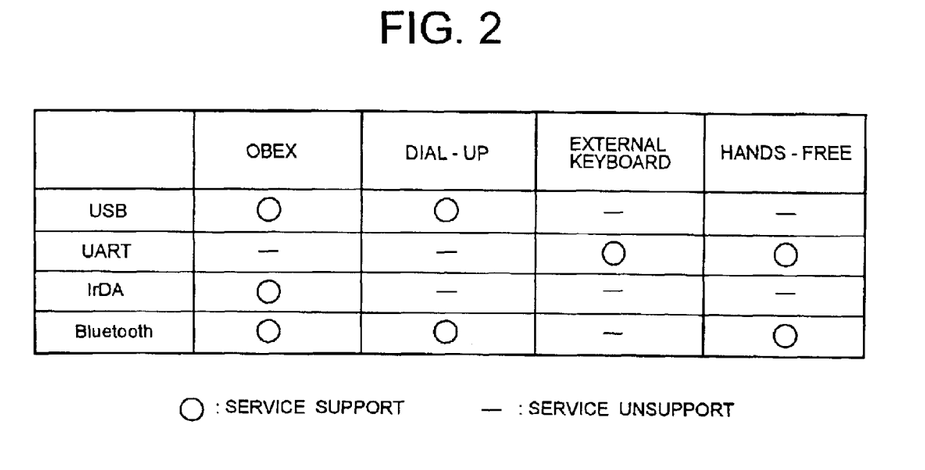
FIG. 2 shows an external input/output device—service support correspondence table.
Figure 3:
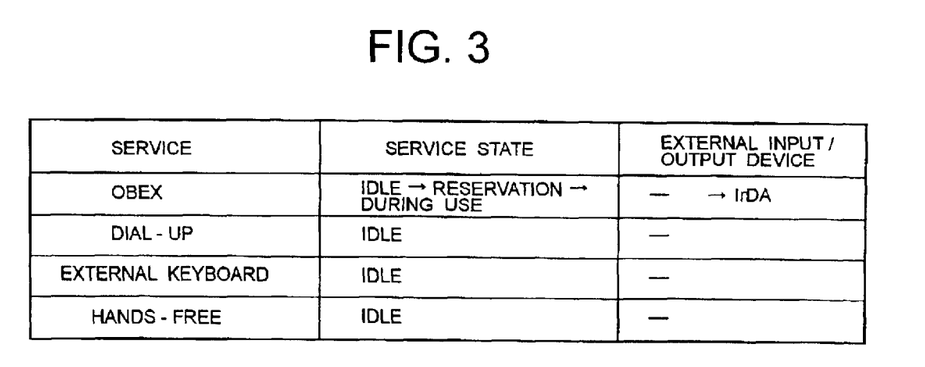
FIG. 3 shows a service state management table.

The transmission line management module 30 comprises an external input/output device—service support correspondence table as shown in FIG. 2 and a service state management table as shown in FIG. 3 to manage the use state of the upper level service. Also, the service state management table has information elements of the service state management table as shown in FIG. 4.

First of all, the external input/output device—service support correspondence table of FIG. 2 will be described below. This table lists the correspondence between the external input/output devices and the services available with the external input/output devices. That is, the OBEX service is usable with the USB, IrDA, and Bluetooth (registered trademark), but unusable with the UART. The dial-up service is usable with the USB, Bluetooth (registered trademark) but unusable with the UART and IrDA. The external keyboard service is usable with the UART but unusable with the USB, IrDA and Bluetooth (registered trademark). And the hands-free service is usable with the UART and Bluetooth (registered trademark) but unusable with the USB and IrDA.

FIG. 3 shows a service state management table. This table lists the correspondence between the use state of each service and the external input/output devices for the service. That is, the table lists the correspondence between the service state indicating whether or not each service is, being used and the name of external input/output device using each service. In FIG. 3, the external input/output device is unused (idle) for the OBEX, dial-up, external keyboard, and hands-free as one example. Among others, the OBEX has the service state changed from idle to reservation to during use. Also, no external input/output device uses the service, but IrDA will use the OBEX service.

Figure 4:
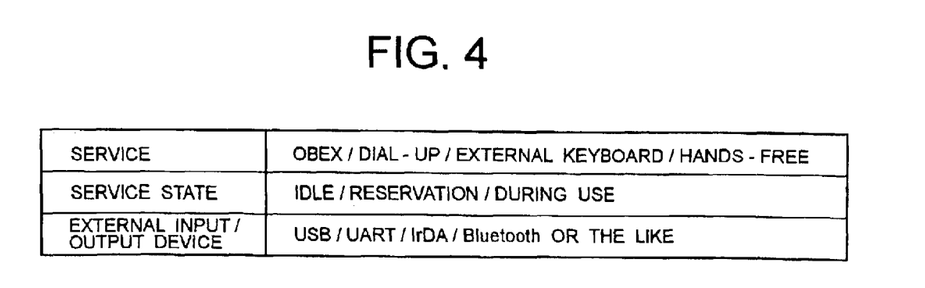
FIG. 4 shows information elements in the service state management table.

FIG. 4 shows information elements in the service state management table. The information elements include the service, the service state, and the external input/output device. Examples of the service include the OBEX, dial-up, external keyboard and hands-free, examples of the service state include idle, reservation and during use, and examples of the external input/output device include the USB, UART, IrDA and Bluetooth (registered trademark).

Figure 5:
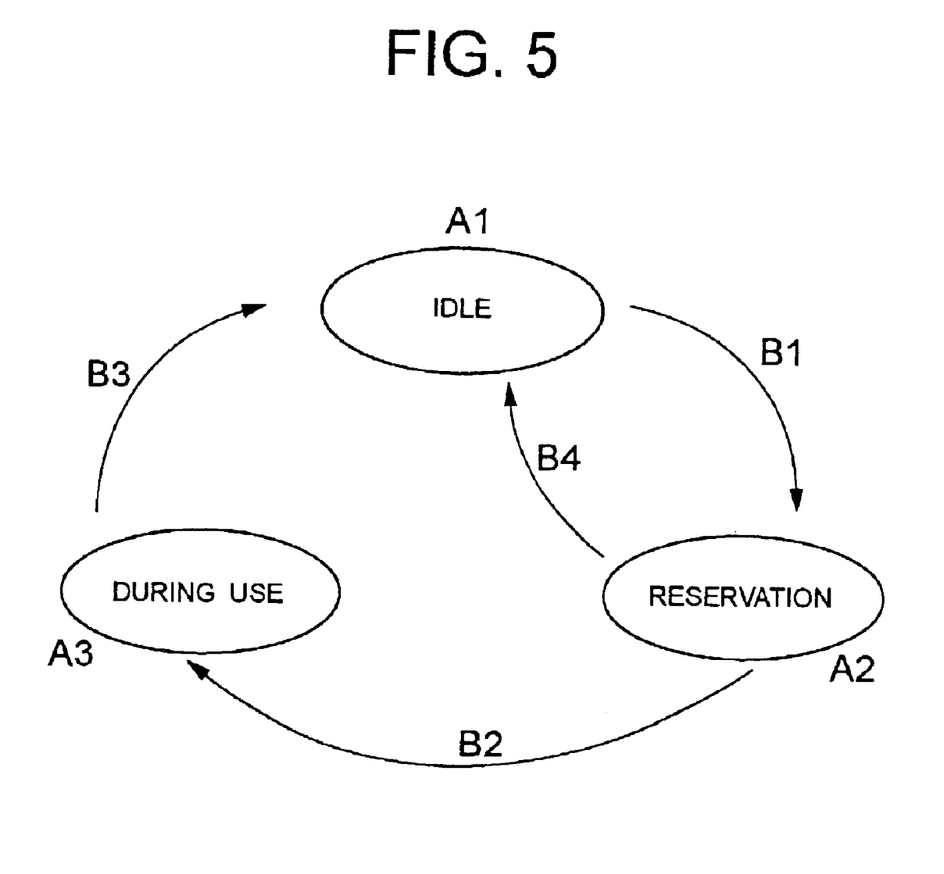
FIG. 5 is a status transition diagram between service states in the service state management table.

FIG. 5 is a status transition diagram between service states in the service state management table. Referring to FIG. 5, the overall operation of this transition diagram will be described below in detail.

Status transition B1 shows a transition from idle A1 to reservation A2. In accepting a connection request from an application and sending a connection request to the adapter, the service state is changed from idle to reservation. Or in accepting a waiting request from an application and sending a waiting request to the adapter, the service state is changed from idle to reservation.

Status transition B2 shows a transition from reservation A2 to during use A3. When a connection request to the service is made and a connection response of acknowledgement is returned from the service, the service state is changed from reservation A2 to during use A3.

Status transition B3 shows a transition from during use A3 to idle A1. In receiving a disconnection request from an application, the service state is changed from during use to idle. Or in receiving a disconnection request from the adapter, the service state is changed from during use to idle.

Status transition B4 shows a transition from reservation A2 to idle A1. This is an abnormal case. For example, this takes place where a connection request is sent to the service, but a negative acknowledgement is returned from the service.

Figure 6:
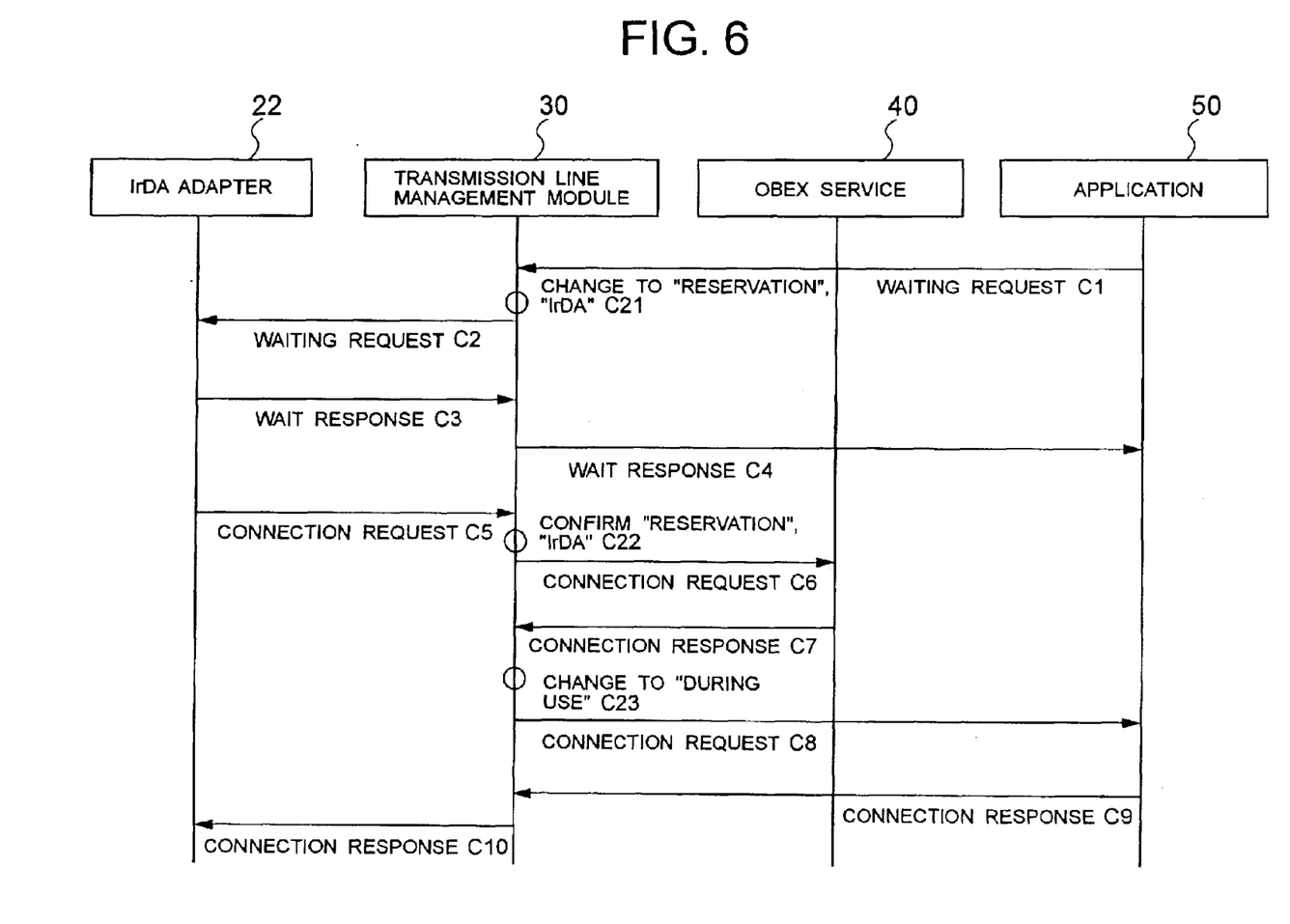
FIG. 6 is a flow sequence showing the operation of this management system in making the OBEX service (server) with IrDA.

Several specific examples will be now described. First of all, a first example will be described below. A first example is a case where the OBEX service (server) is performed with IrDA. FIG. 6 is a flow sequence showing the operation of this management system in making the OBEX service (server) with IrDA.

When the OBEX service (server) is made with IrDA, the portable terminal operates as an OBEX server. The OBEX server receives a request from an OBEX client and makes a response to the request.

For example, if the portable terminal operating as the OBEX server receives an object get request from the OBEX client, the OBEX server sends a file of the self portable terminal to the OBEX client. To effect the OBEX service, it is required for each device to connect to IrDA beforehand.

The portable terminal operating as the OBEX server issues a waiting request for turning IrDA of the self portable terminal in a connection waiting state to wait for a connection request of IrDA from the OBEX client as a connected device (see a waiting request C2 in FIG. 6). A waiting request C1 of FIG. 6 is made to wait for a connection request from the connected device.

As shown in FIG. 6, when the OBEX service (server) is made with IrDA, a waiting request C1 to wait for an OBEX service following request from the connected IrDA device is sent from the application 50 to the transmission line management module 30.

When the transmission line management module 30 receives the waiting request C1, it is determined whether or not IrDA supports the OBEX service by referring to the external input/output device—service support correspondence table of FIG. 2. Since IrDA supports the OBEX service as shown in FIG. 2, it is checked whether or not the state of the OBEX service in the service state management table of FIG. 3 is idle.

Referring to FIG. 3, the service state of the OBEX service is idle initially. On the other hand, when the service state is other than idle, the transmission line management module 30 sends a wait response of negative acknowledgement to the application 50.

Since the service state is idle at present, the service state of the OBEX service is changed to reservation, the external input/output device of the OBEX service is changed to IrDA (C21), and a waiting request C2 is sent to the IrDA adapter 22.

The IrDA 22 is turned in a following request waiting state for the OBEX service from the connected IrDA device upon receiving the waiting request C2, and sends a wait response C3 to the transmission line management module 30. The transmission line management module 30 receives the wait response C3 from IrDA 22, and sends a wait response C4 to the application 50.

The IrDA adapter 22 sends a connection request C5 with the OBEX service 40 to the transmission line management module 30 upon accepting the connection request with the OBEX service from the connected IrDA device.

The transmission line management module 30 checks whether or not the service state of the OBEX service in the service state management table of FIG. 3 is reservation upon receiving the connection request C5. When the service state is reservation, the transmission line management module 30 checks whether or not the external input/output device is IrDA (C22).

On the other hand, when the external input/output device is other than IrDA, a connection response of negative acknowledgement is returned to the adapter that has sent the connection request. Since the external input/output device is IrDA 22 at present, the transmission line management module 30 sends a connection request C6 to the OBEX service 40. If the transmission line management module 30 receives a connection response C7 from the OBEX service 40, it changes the service state of the OBEX service in the service state management table of FIG. 3 to during use (C23), and sends a connection request C8 to the application 50.

If the transmission line management module 30 receives a connection response C9 from the application 40, it sends a connection response C10 to the IrDA adapter 22 to establish a link to the OBEX service.

Figure 7:
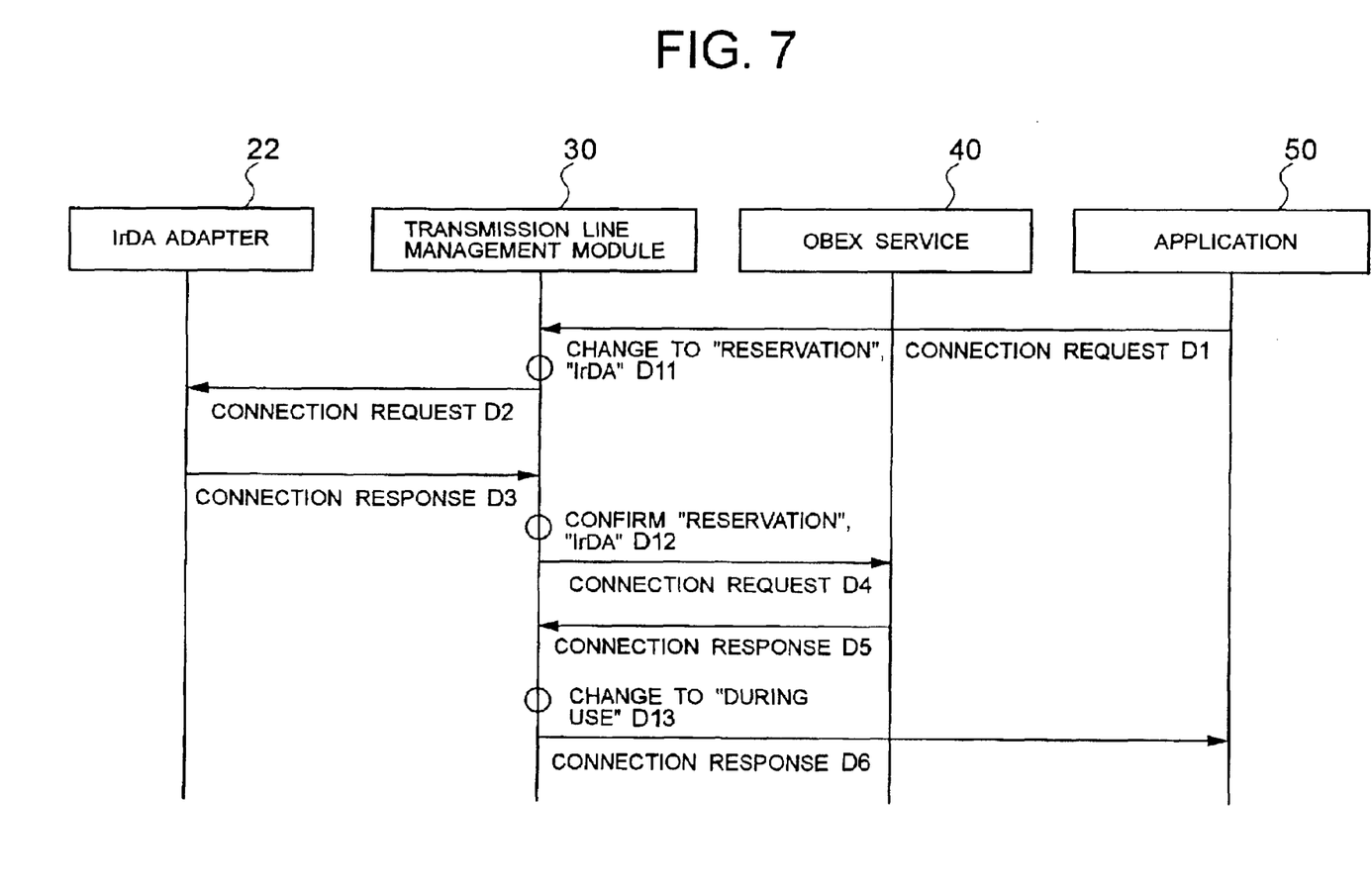
FIG. 7 is a flow sequence showing the operation of this management system in making the OBEX service (client) with IrDA.

Next, a second example will be described below. In the second example, an OBEX service (client) is made with IrDA. FIG. 7 is a flow sequence showing the operation of this management system in making the OBEX service (client) with IrDA.

When the OBEX service (client) is made with IrDA, the transmission line management module 30 sends a connection request D2 to the IrDA adapter 22 to issue a connection request to connect the device waiting as the OBEX server to IrDA (see D2 in FIG. 7). A connection request D1 in FIG. 7 is made to issue a connection request to the connected device.

In the case where the OBEX service (client) is made with IrDA, the transmission line management module 30 changes the service state to reservation, and the external input/output device to IrDA, when receiving the connection request D1 from the application 50 (D11).

The subsequent operation conforms to the first example. Simply describing the subsequent operation, the transmission line management module 30 sends a connection request D2 to the IrDA adapter 22, and the IrDA adapter 22 receiving this connection request D2 returns a connection response D3 to the transmission line management module 30.

The transmission line management module 30 receiving this connection response D3 confirms that the state of the OBEX service is reservation and the external input/output device is IrDA 22 by referring to the service state management table of FIG. 3 (D12), and sends a connection request D4 to the OBEX service 40. The OBEX service 40 receiving this connection request D4 returns a connection response D5 to the transmission line management module 30.

The transmission line management module 30 receiving this connection response D5 changes the service state of OBEX service in the service state management table of FIG. 3 from reservation to during use (D13). And the transmission line management module 30 sends a connection response D6 to the application 50.

With this invention, when receiving a waiting request (C1 in FIG. 6) or a connection request (D1 in FIG. 7) from the application, the transmission line management module changes the service state in the service state management table of FIG. 3 from idle to reservation to manage the external input/output device using the service. Thereby, when there is a waiting request or a connection request for the same service from other application, or a connection request from other external input/output device, a response of failure is returned for this request to disable the same service to be made simultaneously, making the competitive management for external input/output devices. Namely, the competitive management is implemented by refusing a request from other than the external input/output device having the service state changed from idle to reservation.

Next, a third example will be described below. In the case where the external input/output device is the IrDA or Bluetooth (registered trademark) device 23, a waiting request process is required for turning the external input/output device in a connection waiting state to receive a connection request from the external input/output device connected. However, in the case where the USB 20 or UART device 21 is employed, a connection request from the adapter is sent to the transmission line management module, upon a connection request from the connected device by cable connection, without making the waiting request process. The third example is involved in this case.

In order that the state in the status transition diagram of FIG. 5 is changed from idle A1 to reservation 2 (B1), the following condition may be added. That is, when the transmission line management module 30 receives a connection request (E1 in FIG. 8) from the adapter, and sends a connection request (E2 in FIG. 8) to the service, the service state is changed from idle to reservation.

Figure 8:
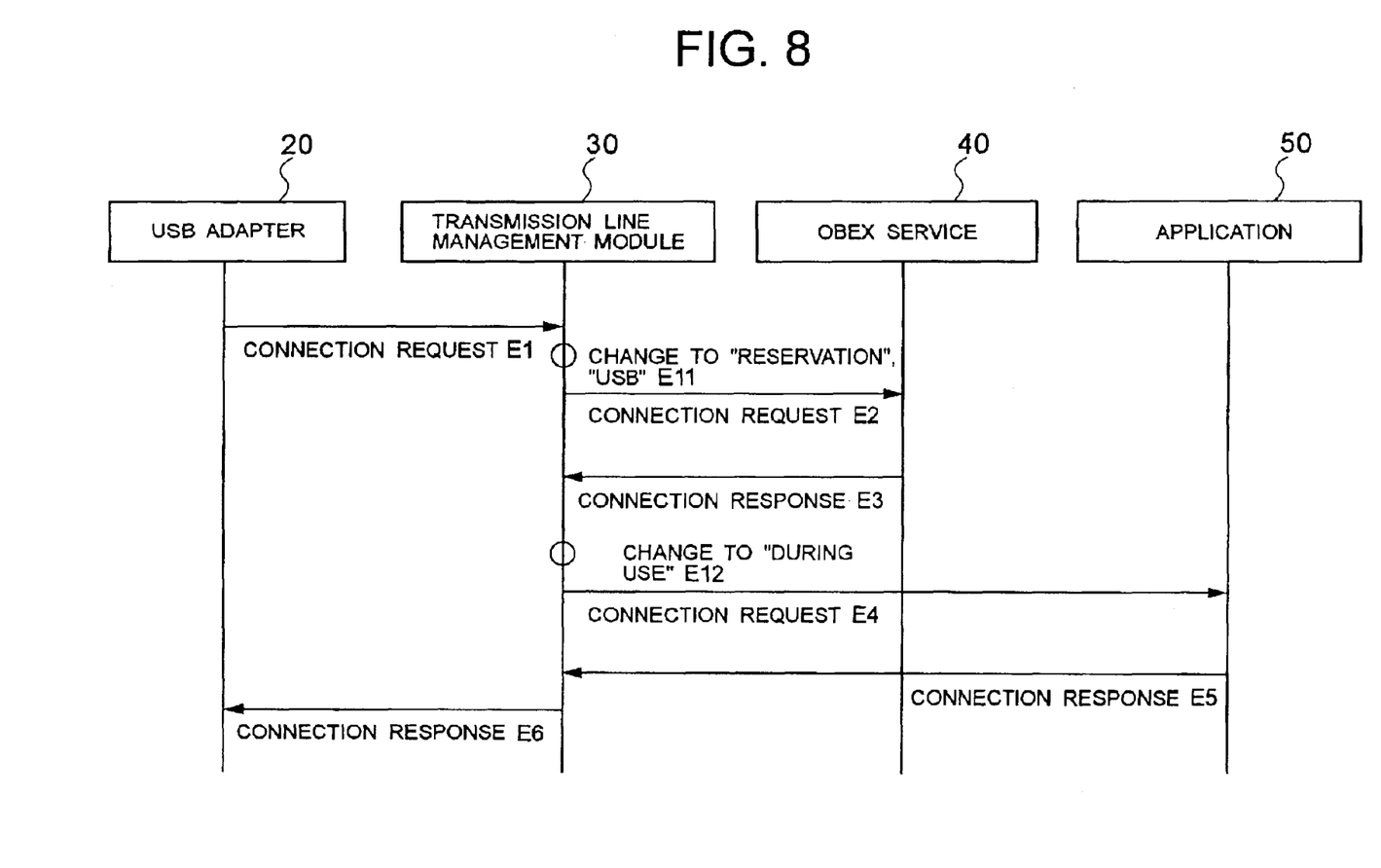
FIG. 8 is a flow sequence showing the operation of this management system in the case where the external input/output device is a USB 20 or UART device 21.
Figure 9:
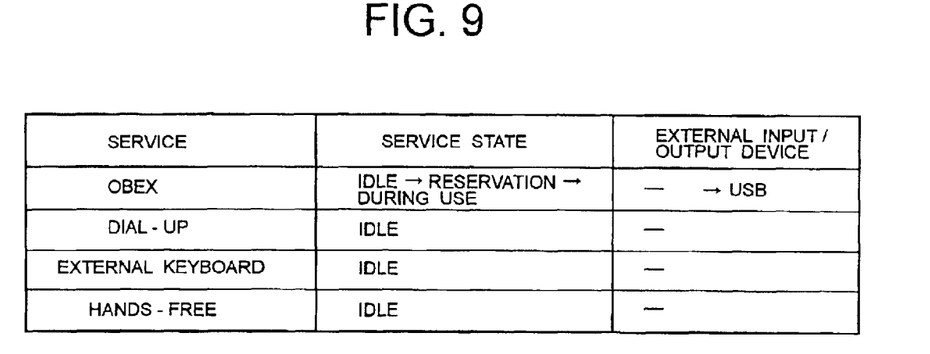
FIG. 9 shows a service state management table according to a third example.

FIG. 8 is a flow sequence showing the operation of this management system in the case where the external input/output device is the USB 20 or UART device 21. FIG. 9 shows a service state management table according to a third embodiment. As shown in FIG. 8, in the case where the OBEX service (server) is made with USB, a connection request E1 from the USB adapter 20 to the OBEX service 40 is sent to the transmission line management module 30.

When the transmission line management module 30 receives a connection request E1, it is determined whether or not the USB supports the OBEX service by referring to the external input/output device—service support correspondence table of FIG. 2. Since the USB supports the OBEX service as shown in FIG. 2, it is confirmed that the service state of OBEX service in the service state management table of FIG. 9 is idle.

In the case where the service state is other than idle, the transmission line management module 30 sends a connection response of connection refusal to the USB adapter 20. Since the service state is idle in this example, the transmission line management module 30 changes the service state of OBEX service to reservation, and changes the external input/output device of OBEX service to USB (E11)(see FIG. 9).

And when the transmission line management module 30 sends a connection request E2 to the OBEX service 40, and receives a connection response E3 from the OBEX service 40, it changes the service state of OBEX service in the service state management table of FIG. 9 to during use (E12), and sends a connection request E5 to the application 50. Upon receiving a connection response E5 from the application 50, the transmission line management module 30 sends a connection response E6 to the USB adapter 20 to establish a link for the OBEX service.

In the case where it is unnecessary to permit connection from the application 50, a sequence of connection request E4 to the application 50 and connection response E5 does not take place.

Next, a fourth example will be described below. The fourth example involves a recording medium recording a program for the external input/output competitive management method. As shown in FIG. 1, this competitive management system for external input/output devices has the recording medium 60 recording the program. This program executes a process with a flow sequence as shown in FIGS. 6 to 8 on the computer. The transmission line management module 30 controls each H/W, the adapters 20 to 23, and the services 40 to 43 in accordance with the program recorded in the recording medium 60 as shown in FIG. 1. Its control contents have been already described and are not described here.

In this example, the external input/output device is IrDA 22, USB 20, and the service is OBEX 40. However, this invention is also applicable to the external input/output devices 21, 23 and the services 41 to 43.

As described above, this invention provides a competitive management system for external input/output devices in a portable terminal comprising a plurality of external input/output devices and one or more services usable with the external input/output devices, the system comprising transmission line managing means for managing the plurality of external input/output devices not to use the same service at the same time, whereby it is unnecessary for each service to make the competitive management for external input/output devices.

Also, the competitive management method for external input/output devices and the recording medium according to this invention exhibit the same effects as the above competitive management system for external input/output devices.

Specifically, the first effect is the ability of making the competitive management for external input/output devices using the service. Its reason is that the transmission line management module makes the service state management. The second effect is the ability of the service being not dependent on the external input/output devices. Its reason is that the transmission line management module exists between the external input/output device and the adapter, and no processing dependent on the external input/output device is performed between the service and the transmission line management module.

What is claimed is:

1. A competitive management system for external input/output devices used in conjunction with a portable terminal comprising:

a plurality of external input/output devices;

one or more services usable with said external input/output devices; and managing means for managing together said one or more services and said plurality of external input/output devices not to use the same service at the same time by referring to a management table.

2. The competitive management system for according to claim 1, wherein said management table contains service state information indicating whether or not the status of each service is idle and external input/output device information indicating by which external input/output device each service is used.

3. The competitive management system according to claim 2, further comprising an application which uses said one or more services, wherein said managing means refers to said management table when receiving a waiting request or a connection request from said application.

4. The competitive management system according to claim 2, wherein said managing means refers to said management table when receiving a connection request to a service from one of said plurality of external input/output devices.

5. The competitive management system according to claim 1, wherein said managing means consists of a single management module.

6. A competitive management method for a system comprising a plurality of external input/output devices and one or more services usable with said external input/output devices, comprising:

managing together said one or more services and said plurality of external input/output devices such that no more than one of said plurality of external input/output devices uses the same service at the same time by referring to a management table.

7. The competitive management method according to claim 6, wherein said management table contains service state information indicating whether or not the status of each service is idle and the-external input/output device information indicating by which external input/output device each service is used.

8. The competitive management method according to claim 7, further comprising referring to said management table when receiving a waiting request or a connection request from an application using one of said one or more services.

9. The competitive management method according to claim further comprising:

referring to said management table when receiving a connection request to a service from one of said plurality of external input/output devices.

10. The competitive management method according to claim 6, wherein the step of managing is performed by a single management module.

11. A program product for a competitive management system for external input/output devices used in conjunction with a portable terminal, comprising:

a comnuter readable medium; and instructions embodied on the comnuter readable medium for enablina the portable terminal to perform operations including:

managing together said one or more services and said plurality of external input/output devices such that no more than one of the plurality of external input/output devices uses use the same service at the same time, by referring to a management table.

12. The program product according to claim 11, wherein the management table contains service state information indicating whether or not the status of each service is idle and external input/output device information indicating by which external input/output device each service is used.

13. The program product according to claim 12, wherein the instructions embodied on the computer readable medium enable the portable terminal to perform operations which further include:

referring to said management table when receiving a waiting request or a connection request from an application using one of the one or more services.

14. The program product according to claim 12, wherein the instructions embodied on the computer readable medium enable the portable terminal to perform operations which further include:

referring to said management table when receiving a connection request to a service from one of the plurality of external input/output devices.

15. The program product according to claim 11, wherein the step of managing is performed by a single management module.

* * * * *